United States Patent [19]

Licatovich

[11] Patent Number: 5,232,480
[45] Date of Patent: Aug. 3, 1993

[54] FILTER

[76] Inventor: Mark Licatovich, 6732 Transparent, Clarkston, Mich. 48346

[21] Appl. No.: 993,103

[22] Filed: Dec. 18, 1992

[51] Int. Cl.$^5$ .............................................. B01D 46/10
[52] U.S. Cl. ........................................ 55/422; 55/493; 55/516; 55/519; 55/528
[58] Field of Search ................. 55/422, 493, 495, 494, 55/514, 516, 519, 528

[56] References Cited

U.S. PATENT DOCUMENTS 2,965,197 12/1960 Dow et al.
3,107,991 10/1963 Taussig.
3,333,404 8/1967 Klun.
3,407,576 10/1968 Staunton.
3,408,438 10/1968 Staunton.
4,086,071 4/1978 Champlin.
4,420,315 12/1983 Kershaw.
4,464,187 8/1984 Kershaw.

Primary Examiner—Charles Hart
Attorney, Agent, or Firm—Basile and Hanlon

[57] ABSTRACT

A filter is disclosed including a four-sided frame having a central aperture therein. Four side walls are provided, with each side wall being pivotally mounted to one side of the frame, and movable between a use position wherein each side wall is substantially perpendicular to the frame, and a storage/shipping position wherein each side wall is substantially parallel to the frame. The filter further comprises a filter member attached to the frame and extending across the central aperture. In the storage/shipping position, the filters are substantially flattened and easily stacked, thereby allowing for efficient storage and ease of transport.

25 Claims, 4 Drawing Sheets

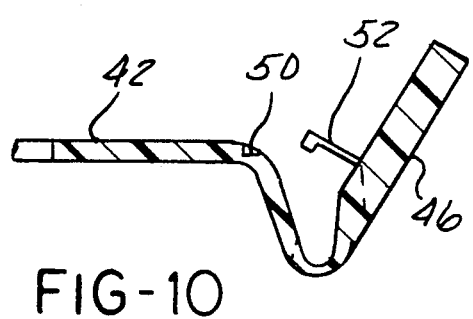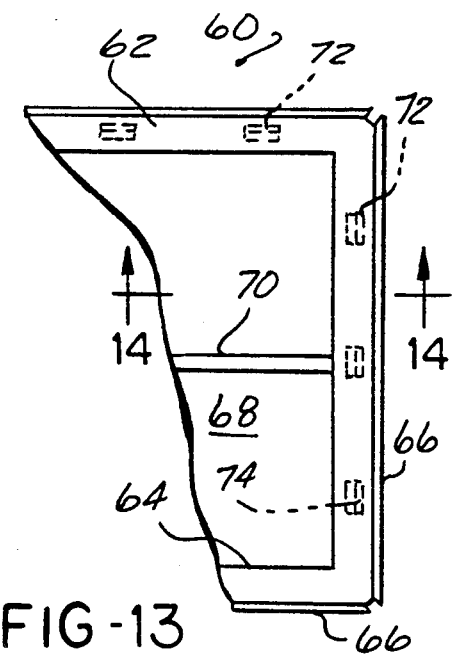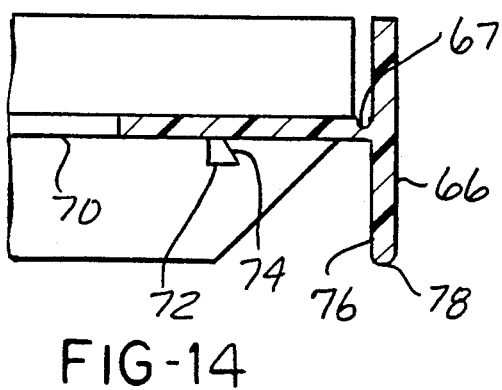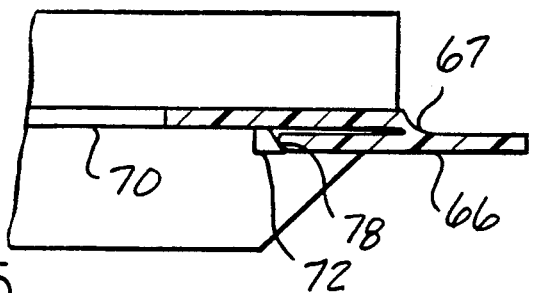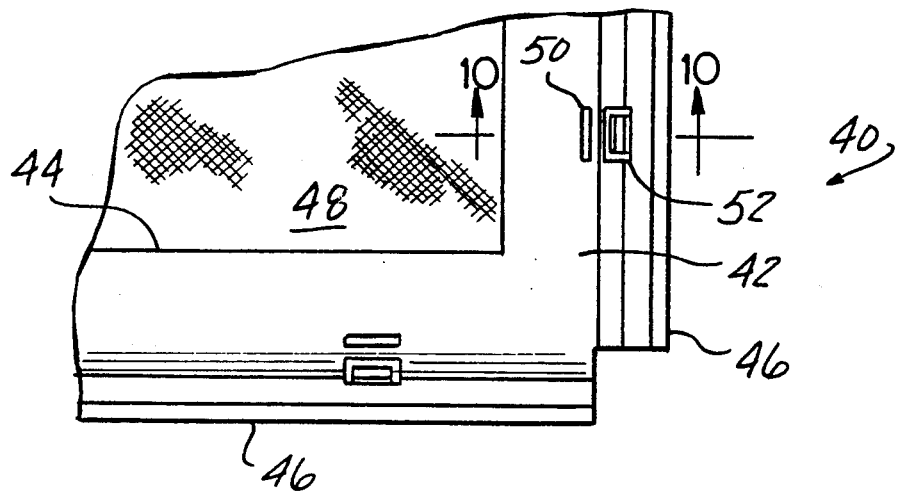

FILTER

BACKGROUND OF THE INVENTION

The present invention relates generally to filters, and more particularly to a furnace filter which is quickly and easily moved from a storage and transport to a use position.

For many years, home owners have recognized the need for furnace filters, in order to greatly reduce the amount of dirt and dust particles blown through and circulating within the dwelling or office building. As a result, manufacturers are continually seeking better and more efficient ways of producing improved quality furnace filters. Many filters in use today are of a rather complex structure, making them time consuming and costly to produce, relatively difficult to store and transport, and difficult for the consumer to use. The simpler filters to manufacture, ship and use are generally disposable, thereby increasing consumer cost each time the filter must be replaced.

Thus, it is an object of the present invention to provide a furnace filter which is simple and cost efficient to produce and may advantageously be washed and reused. It is a further object of the present invention to provide such a filter which is of a simple construction and easily moves between the storage and use positions. It is a further object of the present invention to provide a filter which either substantially flattens out in the storage position or assumes a nesting position, either of which positions advantageously provide for efficient use of storage space and reduced cost in transportation.

SUMMARY OF THE INVENTION

The present invention addresses and solves all the problems enumerated above. The present invention comprises a furnace filter including a four-sided frame having a central aperture therein. Four side walls are provided, with each side wall being pivotally mounted to one side of the frame, and movable between a use position wherein each side wall is substantially perpendicular to the frame, and a storage/shipping position wherein each side wall is substantially parallel to the frame. The filter further comprises a filter member attached to the frame and extending across the central aperture. In the storage/shipping position, the filters are substantially flattened and easily stacked, thereby allowing for efficient storage and ease of transport, with reduced cost.

BRIEF DESCRIPTION OF THE DRAWINGS

Other objects, features and advantages of the present invention will become apparent by reference to the following detailed description and drawings, in which:

FIG. 9 is a cutaway, top view of the second embodiment of the present invention;

FIG. 10 is a cross-sectional view taken on line 10—10 of FIG. 9;

FIG. 13 is a top view of the third embodiment of the present invention;

FIG. 14 is a cross-sectional view taken on line 14—14 of FIG. 13, showing the filter in the use position; and FIG. 15 is a cross-sectional view similar to FIG. 14, showing the third embodiment in the storage/shipping position.

DETAILED DESCRIPTION OF THE PREFERRED EMBODIMENTS

Figure 1:
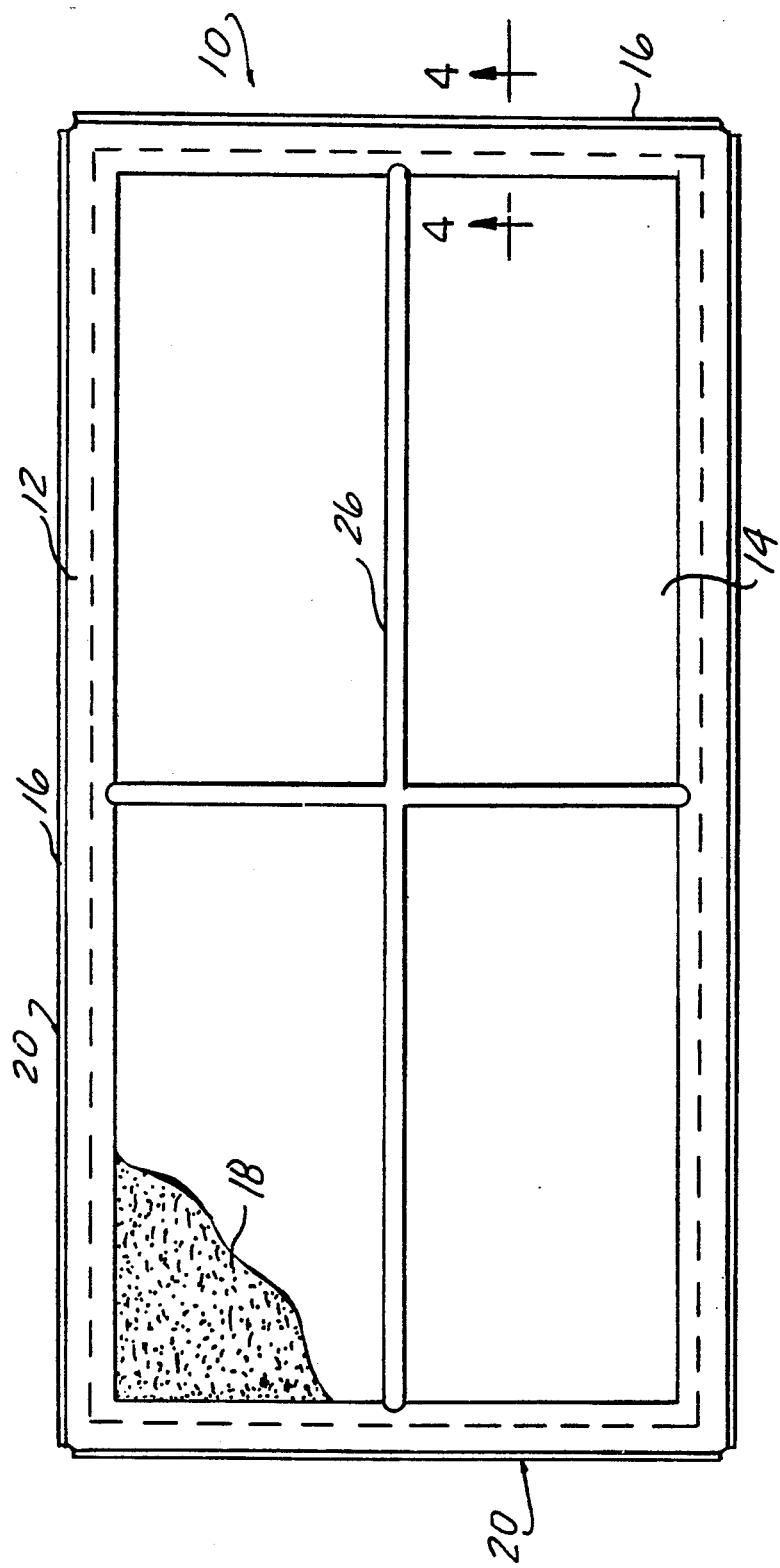
FIG. 1 is a top view of the first embodiment of the present invention, with the filter member partially cut away.
Figure 2:
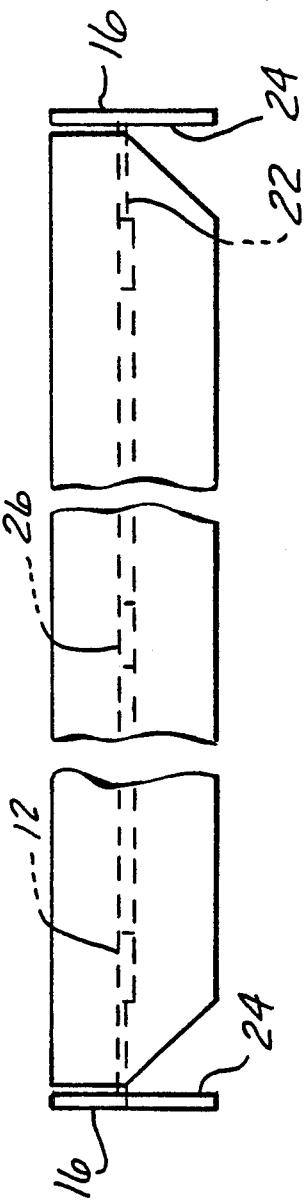
FIG. 2 is a partially cut away, front elevational view of the present invention, shown in the open, use position.
Figure 3:
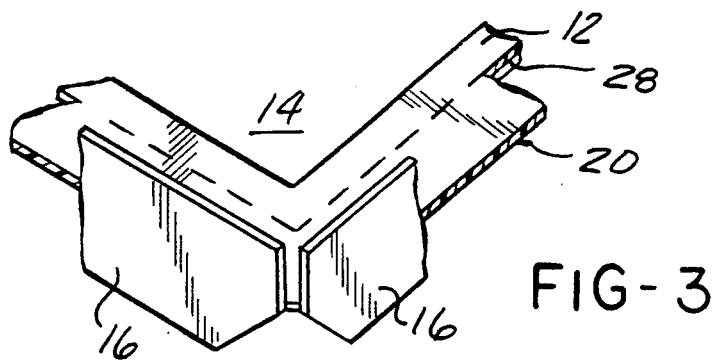
FIG. 3 is a cut away, perspective view of one corner of the present invention, also shown in the use position.
Figure 4:
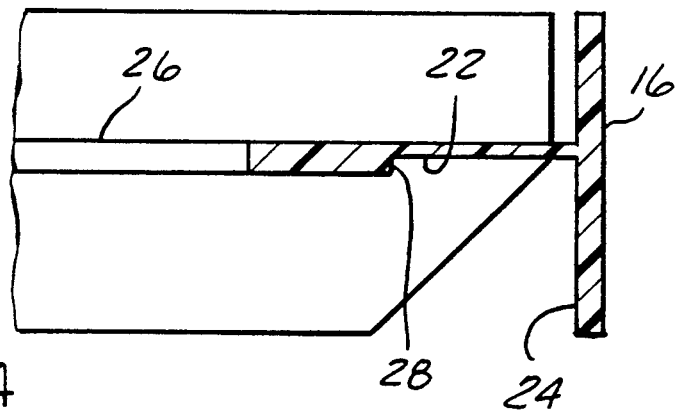
FIG. 4 is a cross-sectional view taken on line 4—4 of FIG. 1.

Referring now to FIG. 1, the filter of the present invention is designated generally as 10. It is to be understood that the present filter may be used in any suitable application, but preferably is directed to furnace filters. Filter 10 comprises a four-sided frame 12 having a central aperture 14 therein. Frame 12 may be formed of any suitable material, such as a suitable yieldably rigid polymeric material. In the preferred embodiment, this polymeric material is polypropylene.

Figure 5:
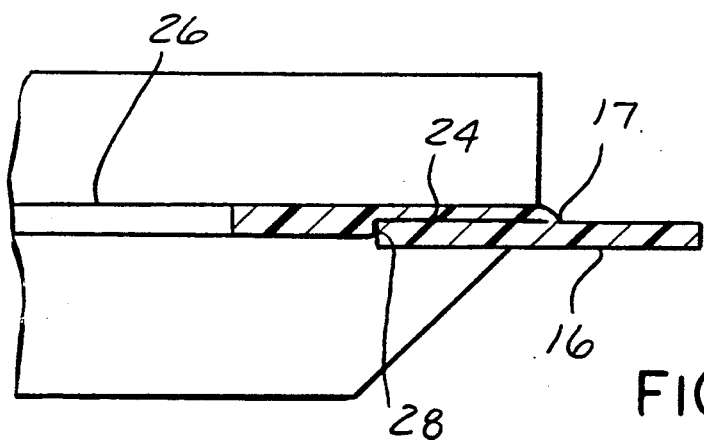
FIG. 5 shows the view from FIG. 4, with the side wall pivoted to the closed, storage/shipping position.

Furnace filter 10 further comprises four side walls 16 also formed of any suitable polymeric material, such as polypropylene. Each side wall 16 is pivotally mounted to one side of frame 12 and movable between a use position (as best seen in FIGS. 1–4) wherein each side wall 16 is substantially perpendicular to frame 12, and a storage/shipping position (as best seen in FIGS. 5–8) wherein each side wall is substantially parallel to frame 12. This pivotal mounting may be accomplished by any suitable means, but in the preferred embodiment, a living hinge 17 (as best seen in FIG. 5) accomplishes this. The frame 12 and side wall 16 may be formed by any suitable method. A filter member 18 is attached to frame 12 and extends across central aperture 14. Filter member 18 may also be formed from any suitable material, including a suitable polymeric filtering material. In the preferred embodiment, this filtering material comprises urethane foam or spun bonded polypropylene. Filter member 18 may be attached to frame 12 by any suitable means, however, in the preferred embodiment, frame 12, side wall 16 and filter member 18 are all integrally molded together, as by injection molding.

Frame 12 has an outer periphery 20. Filter 10 may further comprise a recess 22 integral with, and extending about (adjacent to) the outer periphery 20 of frame 12, wherein, upon pivoting of each of side walls 16 to the storage/shipping position, recess 22 receives an adjacent side wall portion 24 in proximity with frame 12.

Furnace filter 10 may further comprise rib means 26, mounted to frame 12 and extending across central aperture 14, for supporting filter member 18 and for providing frame integrity.

Figure 6:
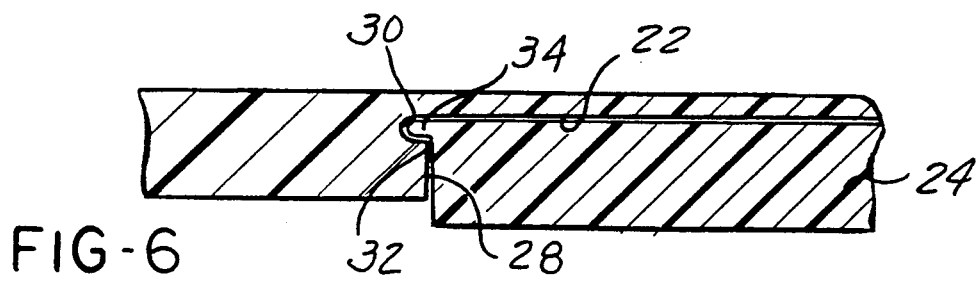
FIG. 6 is an enlarged cross-sectional view of the side wall as shown in FIG. 5, showing an optional releasable locking means.

Furnace filter 10 may further comprise means for releasably locking filter 10 into the storage position. This releasable locking means may comprise any suitable means, however, in the preferred embodiment, recess 22 has a side wall 28, and the releasable locking means comprises a groove 30 defined in recess side wall 28 and terminating at one end in a shoulder portion 32. A projection 34 extends outwardly from adjacent side wall portion 24 and defines an interference surface such that, upon pivotal movement of each side wall 16, the interference surface yieldably slides across shoulder portion 32 to frictionally resist pivotal movement of side wall 16 through at least an intermediate portion of its movement between the use and storage/shipping positions, until in the storage/shipping position, projection 34 is snap fit into groove 30, as seen in FIG. 6.

Figure 7:
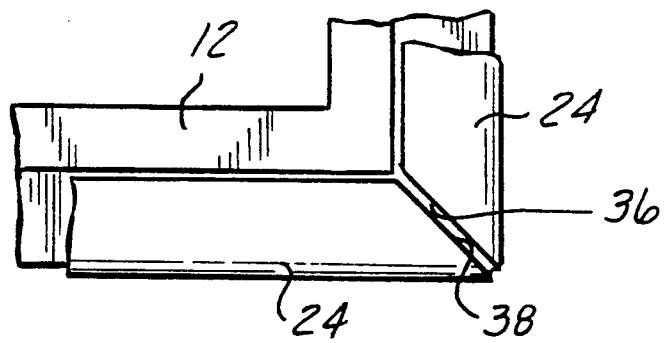
FIG. 7 is a cut away bottom view of one corner of the present invention, shown in the closed, storage/shipping position and showing a mitered joint, with the outer portion of the side walls not shown.

As best seen in FIG. 7, each of the adjacent side wall portions 24 has two ends 36, 38, each end terminating at about a 45° angle, such that, in the storage/shipping position, the side wall portion ends 36, 38 form a mitered joint.

Figure 8:
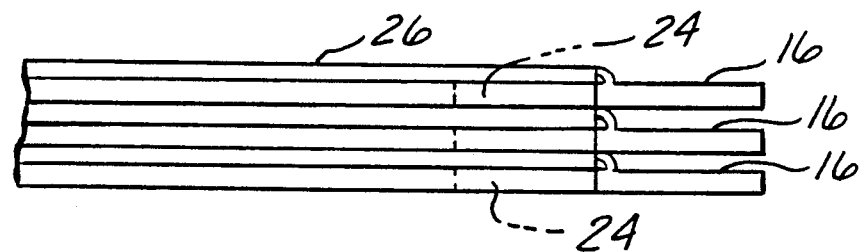
FIG. 8 is a cutaway front view showing three of the filters stacked in the storage/shipping position.

As best seen in FIGS. 5 and 8, in the storage/shipping position, the filter 10 of the present invention essentially flattens out and is substantially the width of frame 12 and rib means 26. In this position, the filters are easily stacked, thereby allowing for efficient storage/shipping and transportation.

Figure 11:
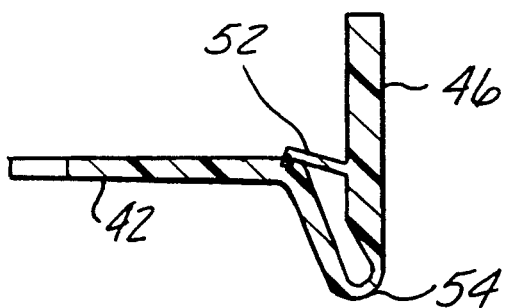
FIG. 11 shows the view of FIG. 10 in the locked or use position.
Figure 12:
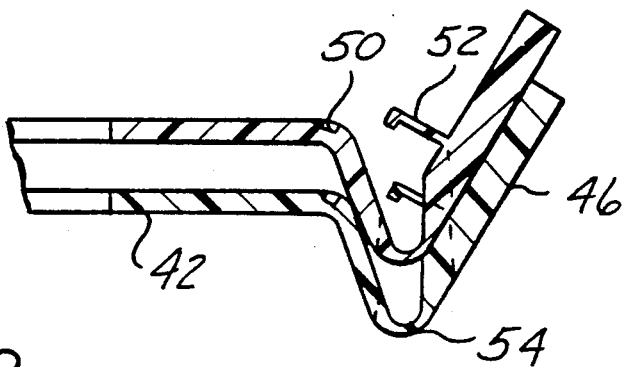
FIG. 12 is a view showing two of the second embodiment filters stacked in the nesting position.

Referring now to FIG. 9, there is shown a second embodiment of the present invention, designated generally as 40. Filter 40 comprises a four sided frame 42 (only a portion of two sides of the frame is shown) having a central aperture 44 therein. Four side walls 46 are provided, with each side wall 46 being pivotally mounted to one side of frame 42 and movable between a use position (as shown in FIG. 11) wherein each side wall 46 is substantially perpendicular to frame 42, and a nesting position (as best seen in FIGS. 10 and 12) wherein each side wall 46 is angularly, outwardly offset from frame 42. In the preferred embodiment, filter 40 may be formed with a living hinge 54 whereby side walls 46 may be freely pivotal between the use and nesting positions. A filter member 48 is attached to frame 42 and extends across central aperture 44.

Furnace filter 40 may further optionally comprise means for releasably locking filter 40 into the use position. This means may comprise any suitable means, however, in the preferred embodiment, the releasable locking means comprises a notch 50 defined in one of each side of frame 42 and each of side walls 46. A latch 52 is defined in the other of each side of frame 42 and each of side walls 46, wherein, upon pivoting of each side wall 46 into the use position, latch 52 will be releasably secured within notch 50, as best seen in FIG. 11. In the preferred embodiment, the notch 50 is defined in each side of frame 42, and the latch 52 is defined in each of side walls 46. As in the first embodiment, the frame and side walls may be formed by any suitable means and of any suitable material. In the preferred embodiment, this material is polypropylene. Similarly, filter member 48 may also be formed of any suitable material, preferably urethane foam or spun bonded polypropylene. Further, in the preferred embodiment, the frame, side walls and filter member are all integrally molded together, as by injection molding, as in the first embodiment.

Referring now to FIGS. 13-15, there is shown a third preferred embodiment of the present invention, designated generally as 60. Filter 60 comprises a four-sided frame 62 having a central aperture 64 therein. Frame 62 may be formed of any suitable material, such as a suitable yieldably rigid polymeric material. In the preferred embodiment, this polymeric material is polypropylene.

Furnace filter 60 further comprises four side walls 66 also formed of any suitable polymeric material, such as polypropylene. Each side wall 66 is pivotally mounted to one side of frame 62 and movable between a use position (as best seen in FIGS. 13 and 14) wherein each side wall 66 is substantially perpendicular to frame 62, and a storage/shipping position (as best seen in FIG. 15) wherein each side wall is substantially parallel to frame 62. This pivotal mounting may be accomplished by any suitable means, but in the preferred embodiment, a living hinge 67 accomplishes this. The frame 62 and side wall 66 may be formed by any suitable method. A filter member 68 is attached to frame 62 and extends across central aperture 64. Filter member 68 may also be formed from any suitable material, including a suitable polymeric filtering material. In the preferred embodiment, this filtering material comprises urethane foam or spun bonded polypropylene. Filter member 68 ma be attached to frame 62 by any suitable means, however, in the preferred embodiment, frame 62, side wall 66 and filter member 68 are all integrally molded together, as by injection molding.

Furnace filter 60 may further comprise rib means 70, mounted to frame 62 and extending across central aperture 64, for supporting filter member 68 and for providing frame integrity.

Furnace filter 60 may further comprise means for releasably locking filter 60 into the storage position. This releasable locking means may comprise any suitable means, however, in the preferred embodiment, the releasable locking means comprises a plurality of projections 72 spacedly mounted on, and extending outwardly and downwardly from frame 62. Projections 72 may be formed and attached to frame 62 by any suitable means, however, in the preferred embodiment, projections 72 are integrally molded with frame 62. Each of projections 72 has an angular recess portion 74. Adjacent side wall portion 76 terminates in a curvilinear end portion defining an interference surface 78 such that, upon pivotal movement of each side wall 66, the interference surface 78 yieldably slides across angular recess portion 74 to frictionally resist pivotal movement of side wall 66 through at least an intermediate portion of its movement between the use and storage/shipping positions, until in the storage/shipping position, the curvilinear end portion of adjacent side wall portion 76 is snap fit into recess 74, as seen in FIG. 15.

As best seen in FIG. 15, in the storage/shipping position, the filter 10 of the present invention essentially flattens out and is substantially the width of frame 62 and rib means 70. In this position, the filters are easily stacked, thereby allowing for efficient storage/shipping and transportation.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A filter, comprising:
    a four-sided frame having a central aperture therein;

four side walls, each side wall being pivotally mounted to one side of the frame and movable between a use position wherein each side wall is substantially perpendicular to the frame, and a storage position wherein each side wall is substantially parallel to the frame; and a filter member attached to the frame and extending across the central aperture.

2. The filter as defined in claim 1 wherein the frame has an outer periphery, and wherein the filter further comprises a recess integral with, and extending about the outer periphery of the frame, wherein, upon pivoting of each of the side walls to the storage position, the recess receives an adjacent side wall portion in proximity with the frame.

3. The filter as defined in claim 1, further comprising rib means, mounted to the frame and extending across the central aperture, for supporting the filter member.

4. The filter as defined in claim 1 wherein each side wall is pivotally mounted to one side of the frame by a living hinge.

5. The filter as defined in claim 2, further comprising means for releasably locking the filter into the storage position.

6. The filter as defined in claim 5 wherein the recess has a side wall, and wherein the releasable locking means comprises:

a groove defined in the recess side wall and terminating at one end in a shoulder portion; and a projection extending outwardly from the adjacent side wall portion and defining an interference surface such that, upon pivotal movement of each side wall, the interference surface yieldably slides across the shoulder portion to frictionally resist pivotal movement of the side wall through at least an intermediate portion of its movement between the use and storage positions, until in the storage position, the projection is snap fit into the groove.

7. The filter as defined in claim 1 wherein the frame and side walls are formed of a polymeric material.

8. The filter as defined in claim 1 wherein the frame and side walls are formed of a first polymeric material, and wherein the filter member is formed of a second polymeric material.

9. The filter as defined in claim 8 wherein the frame, side walls and filter member are integrally molded.

10. The filter as defined in claim 2 wherein each of the adjacent side wall portions has two ends, each end terminating at about a 45° angle, such that, in the storage position, the side wall portion ends form a mitered joint.

11. The filter as defined in claim 1, further comprising means for releasably locking the filter into the storage position.

12. The filter as defined in claim 11 wherein the releasable locking means comprises:

a plurality of projections spacedly disposed on, and extending outwardly and downwardly from the frame;

an angular recess portion defined in each of the projections; and an adjacent side wall portion in proximity with the frame, the adjacent side wall portion terminating in a curvilinear end portion defining an interference surface such that, upon pivotal movement of each side wall, the interference surface yieldably slides across the angular recess portion to frictionally resist pivotal movement of the side wall through at least an intermediate portion of its movement between the use and storage positions, until in the storage position, the curvilinear end portion of the adjacent side wall portion is snap fit into the angular recess.

13. The filter as defined in claim 12 wherein each side wall is pivotally mounted to one side of the frame by a living hinge.

14. A filter, comprising:

a four-sided frame formed of a first polymeric material, having a central aperture therein and having an outer periphery;

four side walls formed of the first polymeric material, each side wall being pivotally mounted to one side of the frame and movable between a use position wherein each side wall is substantially perpendicular to the frame, and a storage position wherein each side wall is substantially parallel to the frame;

a filter member formed of a second polymeric material, the filter member attached to the frame and extending across the central aperture, the frame, side walls and filter member being integrally molded;

rib means, mounted to the frame and extending across the central aperture, for supporting the filter member;

a recess integral with, and extending about the outer periphery of the frame, wherein, upon pivoting of each of the side walls to the storage position, the recess receives an adjacent side wall portion in proximity with the frame;

a side wall on the recess;

means for releasably locking the filter into the storage position, wherein the releasable locking means comprises:

a groove defined in the recess side wall and terminating at one end in a shoulder portion; and a projection extending outwardly from the adjacent side wall portion and defining an interference surface such that, upon pivotal movement of each side wall, the interference surface yieldably slides across the shoulder portion to frictionally resist pivotal movement of the side wall through at least an intermediate portion of its movement between the use and storage positions, until in the storage position, the projection is snap fit into the groove; and two ends defined on each of the adjacent side wall portions, each end terminating at about a 45° angle, such that, in the storage position, the side wall portion ends form a mitered joint.

15. A filter, comprising:

a four-sided frame formed of a first polymeric material, having a central aperture therein;

four side walls formed of the first polymeric material, each side wall being pivotally mounted to one side of the frame and movable between a use position wherein each side wall is substantially perpendicular to the frame, and a storage position wherein each side wall is substantially parallel to the frame;

a filter member formed of a second polymeric material, the filter member attached to the frame and extending across the central aperture, the frame, side walls and filter member being integrally molded;

rib means, mounted to the frame and extending across the central aperture, for supporting the filter member; and means for releasably locking the filter into the storage position, wherein the releasable locking means comprises:
- a plurality of projections spacedly disposed on, and extending outwardly and downwardly from the frame;
- an angular recess portion defined in each of the projections; and
- an adjacent side wall portion in proximity with the frame, the adjacent side wall portion terminating in a curvilinear end portion defining an interference surface such that, upon pivotal movement of each side wall, the interference surface yieldably slides across the angular recess portion to frictionally resist pivotal movement of the side wall through at least an intermediate portion of its movement between the use and storage positions, until in the storage position, the curvilinear end portion of the adjacent side wall portion is snap fit into the angular recess.

16. The filter as defined in claim 15 wherein each side wall is pivotally mounted to one side of the frame by a living hinge.

17. A furnace filter, comprising:
- a four-sided frame formed of a first polymeric material, having a central aperture therein;
- four side walls formed of the first polymeric material, each side wall being pivotally mounted to one side of the frame and movable between a use position wherein each side wall is substantially perpendicular to the frame, and a storage position wherein each side wall is substantially parallel to the frame;
- a living hinge pivotally mounting each side wall to one side of the frame;
- a filter member formed of a second polymeric material, the filter member attached to the frame and extending across the central aperture, the frame, side walls and filter member being integrally molded;
- rib means, mounted to the frame and extending across the central aperture, for supporting the filter member; and
- means for releasably locking the filter into the storage position, wherein the releasable locking means comprises:
  - a plurality of projections spacedly disposed on, and extending outwardly and downwardly from the frame;
  - an angular recess portion defined in each of the projections; and
  - an adjacent side wall portion in proximity with the frame, the adjacent side wall portion terminating in a curvilinear end portion defining an interference surface such that, upon pivotal movement of each side wall, the interference surface yieldably slides across the angular recess portion to frictionally resist pivotal movement of the side wall through at least an intermediate portion of its movement between the use and storage positions, until in the storage position, the curvilinear end portion of the adjacent side wall portion is snap fit into the angular recess.

18. A filter, comprising:
- a four-sided frame having a central aperture therein;
- four side walls, each side wall being pivotally mounted to one side of the frame and movable between a use position wherein each side wall is substantially perpendicular to the frame, and a nesting position wherein each side wall is angularly, outwardly offset from the frame; and
- a filter member attached to the frame and extending across the central aperture.

19. The filter as defined in claim 18, further comprising means for releasably locking the filter into the use position.

20. The filter as defined in claim 19 wherein the releasable locking means comprises:
- a notch defined in one of each side of the frame and each of the side walls; and
- a latch defined in the other of each side of the frame and each of the side walls;
- wherein, upon pivoting of each side wall into the use position, the latch will be releasably secured within the notch.

21. The filter as defined in claim 20 wherein the notch is defined in each side of the frame, and the latch is defined in each of the side walls.

22. The filter as defined in claim 18 wherein the frame and side walls are formed of a polymeric material.

23. The filter as defined in claim 18 wherein the frame and side walls are formed of a first polymeric material, and wherein the filter member is formed of a second polymeric material.

24. The filter as defined in claim 23 wherein the frame, side walls and filter member are integrally molded.

25. A filter, comprising:
- a four-sided frame formed of a first polymeric material and having a central aperture therein;
- four side walls formed of the first polymeric material, each side wall being pivotally mounted to one side of the frame and movable between a use position wherein each side wall is substantially perpendicular to the frame, and a nesting position wherein each side wall is angularly, outwardly offset from the frame;
- a filter member formed of a second polymeric material and attached to the frame and extending across the central aperture, the frame, side walls and filter member being integrally molded; and
- means for releasably locking the filter into the use position, wherein the releasable locking means comprises:
  - a notch defined in each side of the frame; and
  - a latch defined in each of the side walls;
  - wherein, upon pivoting of each side wall into the use position, the latch will be removably secured within the notch.

* * * * *